United States Patent [19]

Schock

[11] Patent Number: 5,218,013

[45] Date of Patent: Jun. 8, 1993

[54] COMPONENT, IN PARTICULAR, BUILT-IN SINK, AND METHOD FOR ITS MANUFACTURE

[75] Inventor: Friedrich Schock, Schorndorf, Fed. Rep. of Germany

[73] Assignee: Schock & Co. GmbH, Schorndorf, Fed. Rep. of Germany

[21] Appl. No.: 411,327

[22] Filed: Sep. 22, 1989

[30] Foreign Application Priority Data

Sep. 23, 1988 [DE] Fed. Rep. of Germany ....... 3832351

[51] Int. Cl.$^5$ .............................................. C08K 9/00
[52] U.S. Cl. .................................. 523/209; 523/217; 524/445
[58] Field of Search ................. 523/217, 209; 524/445

[56] References Cited

U.S. PATENT DOCUMENTS 3,078,249 2/1963 Russell .................................. 260/40
3,433,860 3/1969 Ruggles et al. ........................ 264/71

FOREIGN PATENT DOCUMENTS 1298801 12/1972 United Kingdom .

OTHER PUBLICATIONS

Periodical "Kunststoffberater", Issue Jul. 8, 1987, pp. 61–65, von Dipl.-Ing. Reiner Kreis, Dusseldorf.
Periodical "Kunststoffe im Bau", vol. 1, 1985, pp. 33–34.

*Primary Examiner*—Paul R. Michl
*Assistant Examiner*—U. K. Rajguru
*Attorney, Agent, or Firm*—Flynn, Thiel, Boutell & Tanis

[57] ABSTRACT

In a component such as a built-in sink, a washhand basin or the like, having a visible side and a rear side and consisting of a compound made of a resin which forms a matrix and of a filler comprised, at least predominantly, of quartz particles, in order to improve the wearing quality, the majority of the quartz particles have a size of between 0.1 mm and 2 mm, the filler constitutes about 60% to 80% by weight of the compound, the quartz particles have an unbroken grain shape and in the areas of the component subject to severe stress during use are packed more densely than those on the rear side of the component. To manufacture such a component, a mold is placed, for curing of the resin, in a position in which the visible side of the areas of the component subject to severe stress during use faces downwards.

14 Claims, 2 Drawing Sheets

COMPONENT, IN PARTICULAR, BUILT-IN SINK, AND METHOD FOR ITS MANUFACTURE

The invention relates to a component, in particular, a fixture such as a built-in sink, a counter for a built-in kitchen, a bathtub, a washhand basin, a shower cubicle base or the like, but also to a component such as a tile, more specifically, a component with a visible side and a rear side made of a compound consisting of a polymerized and partially cross-linked resin which forms a matrix, and of a filler comprised, at least predominantly, of mineral filler particles, in particular, crystalline quartz. The invention further relates to a method for manufacturing such a component with a mold which forms a mold cavity corresponding to the shape of the component and which contains a runner leading into the mold cavity as well as a vent outlet for the mold cavity, with a free-flowing mixture made of a curable resin and a filler comprised, at least predominantly, of mineral filler particles, being introduced into the mold cavity via the runner and the air being evacuated from the mold cavity via the vent outlet, and the resin thereupon being cured.

The firm of Schock & Co. GmbH of 7060 Schorndorf, Federal Republic of Germany, manufactures such fixtures which are characterized by the brand name SILACRON (registered trademark of Schock & Co. GmbH). To manufacture the fixtures, a free-flowing mixture is made from a solution of polymethyl methacrylate in methyl methacrylate and a filler consisting of $SiO_2$ particles. In this mixture, the proportion of filler amounts to 62% to 66% by weight, and the quartz used as filler is previously recrystallized in a furnace to cristobalite and then ground up so the majority of the filler particles have a size of between 5 $\mu$m and 50 $\mu$m. After filling the cavity of the mold used, the mold is heated in order to polymerize the resin.

In spite of the great market success of, for example, the SILACRON built-in sinks made by Schock & Co. GmbH, there is a demand for components of the kind mentioned at the beginning which are superior to the SILACRON products in at least one aspect, for example, with respect to their susceptibility to visible scratch marks or to unremovable stains on the visible side of the components.

An improvement of a component of the kind mentioned at the beginning can be achieved in accordance with the invention in that the majority of the mineral filler particles have a size of between approximately 0.1 mm and approximately 2 mm, in that the mineral filler particles have an unbroken grain shape, and in that the filler constitutes about 50% to 85% by weight, in particular, approximately 60% to 80% by weight, of the compound. It has been shown that the mineral filler particles which are substantially larger than the filler particles of the known components of the kind mentioned at the beginning result in a textured visible side, i.e., the side that is used, of the components. The reason for this lies in the fact that during curing of the resin, the compound which consists predominantly of resin and filler particles, shrinks more markedly in the surface region of the components between the large filler particles; for example, pure acrylic resin shrinks by 22%. Consequently, microscopic depressions are formed between the large filler particles which are close to the surface. The known fixtures of the kind mentioned at the beginning, in which the majority of the filler particles have a size of between 5 $\mu$m and 50 $\mu$m, have a smooth, high-gloss surface on which scratches are much more visible than on the textured surface of a component according to the invention. The mineral filler particles with an unbroken grain shape that are to be used as fillers in accordance with the invention can be obtained extremely cheaply as a natural product since crystalline quartz sand is a by-product of kaolin extraction. In addition, the rounded edges or surfaces of the filler particles result in a dense resin surface, also on the visible side of the component, and in smooth transition surfaces between the resin and the filler particles, which, as has been shown, means that the components according to the invention virtually never get stained during use when they come into contact with dyes, fats or oils, alkaline solutions, acids and the like. Moreover, no so-called water whitening effect occurs, even in the case of alternating exposure to hot and cold water. This feature, in addition to the fact that the components according to the invention almost never get stained, applies even in those cases where the resin layer coating the filler particles close to the surface has been partially or completely removed by abrasion on the visible side, i.e., the side that is used, a fact which is probably due to the size of the filler particles, their rounded surfaces and the resulting smooth transition surfaces between the filler particles and the resin. Also, the resin surfaces which have shrunk away from the surface between the large filler particles are not affected if the component suffers abrasion, because these resin surfaces are recessed between the filler particles and thus lie protected. For this reason, it is easy to clean the smooth and dense surface. Finally, the high proportion of filler particles, preferably between approximately 70% and approximately 80% by weight, and the resulting high viscosity of the mixture consisting of resin and filler which is introduced into a mold counter the tendency of the filler particles to settle during handling of the mixture being processed. This effect can be intensified by adding a thixotropic agent to the mixture; with acrylic resin, a portion of polymethyl methacrylate dissolved in methyl methacrylate works as a thixotropic agent, but other known substances such as, for example, highly dispersed silicic acid can also be used as such.

Moreover, it is also possible to achieve a substantial improvement over the prior art by choosing the composition of a component of the kind mentioned at the beginning such that the majority of the mineral filler particles have a size of between approximately 0.1 mm and approximately 2 mm, that the filler constitutes about 50% to 85% by weight, in particular, approximately 60% to 80% by weight of the compound, and that in the areas of the component subject to severe stress during use, the packing density of the mineral filler particles, i.e., the filler proportion of the compound is greater on the visible side of the component than on its rear side; the latter is achievable, in particular, by holding the mold during curing of the resin in a position in which the visible side of the areas of the component subject to severe stress during use faces downwards so the filler particles can settle somewhat towards the bottom wall of the mold cavity. Regarding the advantages of such a component, reference is made to the preceding embodiments (with the exception of the advantages which result from the unbroken grain shape), in addition to which there is the further benefit that the higher packing density of the filler particles in the areas of the visible side of the component subject to severe stress gives rise to greater surface hardness. Since the viscosity of the compound to be introduced into the mold depends on the temperature and it is desirable for the filler particles to settle in the mold towards the bottom wall of the mold cavity, as mentioned above, it is advisable to warm up, in particular, to approximately 80 degrees C., at least this mold cavity wall before introducing the compound so that the compound can be made up in such a way that it remains thixotropic before and while it is introduced, but, at the same time, permits the filler particles to settle in the mold before curing since the viscosity decreases as a result of the temperature. Once the polymerization process starts, the level of viscosity increases drastically, thus terminating the sedimentation of the filler.

As is evident from the statements above, it is, of course, advantageous in the variant first mentioned for the packing density of the filler particles to be greater on the visible side than on the rear side of the component in the areas of the component subject to severe stress during use. For the second variant, it is beneficial to have filler particles with an unbroken grain shape. The advantages thereby achieved are apparent from the explanations given above.

An example of the areas of a component of the kind in question which are subject to severe stress during use is the bottom surface of a sink, in particular, of a kitchen sink, but also the top of a cabinet or counter for a built-in kitchen or the top of a bathroom sink or the draining or working surface of a built-in sink, whereas the side walls of a kitchen sink, for example, are not subject to severe stress during use.

As mentioned above, it is advisable to use crystalline quartz sand obtained as a by-product of kaolin extraction as filler. Besides being cheap, crystalline quartz sand also has an unbroken grain shape with rounded surfaces and the necessary degree of purity after processing.

In known components of the kind mentioned at the beginning, the resin that forms the matrix of the compound is dyed if the components are supposed to be colored. This gives rise to two disadvantages: Firstly, scratches are conspicuous in the form of light-colored to white lines and, secondly, whenever a metallic object scrapes the surface of such a known component, for instance, a piece of cutlery running over the bottom of a kitchen sink, scratches occur as a result of metallic abrasion since almost all coating dyes contain titanium dioxide, which is extremely hard. For this reason, the invention proposes a completely different approach for manufacturing colored components. Herein, mineral filler particles that have a color coating on their surface are used as filler. Owing to the fact that the mineral filler particles used as filler in accordance with the invention are translucent by nature, a scratch in the color coating applied to the surface of the particles causes the color of the undamaged surface coating to shine through the exposed filler particle surface and through the transparent particle body and so a scratch does not appear as a light-colored to white line. As a further improvement for components according to the invention, it is advisable to make the matrix colorless, i.e., to use an undyed resin in order to avoid the scrape lines caused by the titanium dioxide (the so-called writing effect), as described above. It has proven particularly expedient to use a color coating which contains at least one color pigment and, as binder, at least one silicate, in particular, an alkali silicate, or a plastic, in particular, polyurethane, methacrylate or epoxy resin. Above all, sodium silicate constitutes a good bonding agent between the filler particles and the resin forming the matrix.

It has proven particularly beneficial to use as filler, mineral filler particles with such a grading curve that the majority of the mineral filler particles have a size of between approximately 0.1 mm and approximately 1 mm. It is even better for approximately 70% to 85%, in particular, approximately 80% of the mineral filler particles to have a size of between approximately 0.1 mm and approximately 0.4 mm.

As is evident from the aforesaid, the aim is to achieve as high a proportion of filler as possible and so in a preferred embodiment, the filler constitutes at least approximately 73% by weight of the compound. In practice, it is hardly possible to obtain values above 76% by weight under economically feasible conditions.

In use, components according to the invention in which the resin matrix consists of polymethyl methacrylate have proven highly advantageous; however, polyesters and epoxy resins are also very suitable.

Another parameter that can be controlled by the size and/or the density of the silicate particles for the compound used for components according to the invention is the so-called Taber abrasion value; in order to calculate this value, a standardized rotating grinding disk removes material from the surface of the component under standardized conditions and the material removed during a certain number of revolutions of the grinding disk is weighed. Preference is given to components made of a compound which leads to Taber abrasion values on the visible side in the areas of the component subject to severe stress during use which are below 4 mg/100 r, preferably approximately 3.5 mg/100 r at the most, and, in particular, between approximately 3.5 and approximately 3.0 mg/100 r. For purposes of comparison, it should be mentioned that for components made of the SILACRON material referred to at the beginning, the Taber abrasion value is about twice that of the components according to the invention.

In order to manufacture a component with a gradient of the filler portion that is more dense from the visible side to the rear side of the areas of the component subject to severe stress during use, it is advisable to use a method of the kind mentioned at the beginning, wherein for curing of the resin, the mold is held in a curing position in which the visible side of the areas of the component subject to severe stress during use faces downwards. If the mold is held in this position for a period of time starting at least shortly before the curing starts and ending when at least most of the resin has been cured, the filler particles can settle at the bottom due to gravity, thereby causing a higher proportion of filler in the compound on the visible side of the above-mentioned areas. This is especially the case when, as mentioned above, the viscosity of the compound is reduced by introducing it into a heated mold. If one observes the areas which are subject to severe stress during use, for example, in a built-in kitchen sink unit with a sink and a counter or a draining surface, all of these areas, i.e., the bottom of the sink and the counter or the draining surface, run at least almost parallel to each other.

For filling the mold cavity with the free-flowing mixture, it is advisable to place the mold in a filling position in which the mixture introduced through the runner can completely displace the air from the mold cavity through the vent outlet, after which the mold is rotated into the curing position.

Especially for manufacturing colored components, one should try to prevent the free-flowing mixture from forming streams that meet with each other somewhere inside the cavity when the latter is being filled, because this can result in the formation of visible flow or stream lines in the finished component. For this reason, it is advisable to choose the filling position and the arrangement of the runner such that when the mold cavity is being filled, it is not possible for streams of the free-flowing mixture to meet with each other in the mold cavity.

In order to ensure that during curing of the resin, the mixture consisting predominantly of filler and resin shrinks away essentially only from the wall of the mold cavity which is adjacent to the rear side of the component, it is advisable, for curing of the resin, for the mold surfaces resting against the visible side of the component to be heated first and/or to be heated up to a higher temperature than the mold surfaces resting against the rear side of the component. The curing process then starts on the side of the component which is later the visible side, and the mixture of filler and resin forms a hard surface there before the actual volume shrinkage of, for example, 8% by volume to 10% by volume sets in . As is evident from the preceding explanations, on the visible side shrinkage only occurs in the microscopic regions between the filler particles, thereby giving rise to a component with an undistorted visible side. This is even more the case in that variant in which measures are taken to provide a greater percentage of filler particles on the visible side.

Further features, advantages and details of the invention are given in the following description of several preferred embodiments of the invention; these are also explained in the appended drawings which show sections through two different molds for the manufacture of kitchen sinks, more specifically, in:

BRIEF DESCRIPTION OF DRAWINGS

FIG. 1 shows a base frame 10 on which several clamps 12 which pivot about axes 14 are attached. The base frame 10 carries a mold 20 comprised of two mold halves 16 and 18, which forms a mold cavity 22 and which is pressed by the clamps 12 against flexible pressure pads 24 which are filled with compressed air or another compressible pressure medium by means of which the mold 20 rests on the base frame 10. This base frame can be rotated via means, not illustrated herein, about a pivot axis 26 which extends perpendicularly to the drawing plane of FIG. 1.

Figure 1:
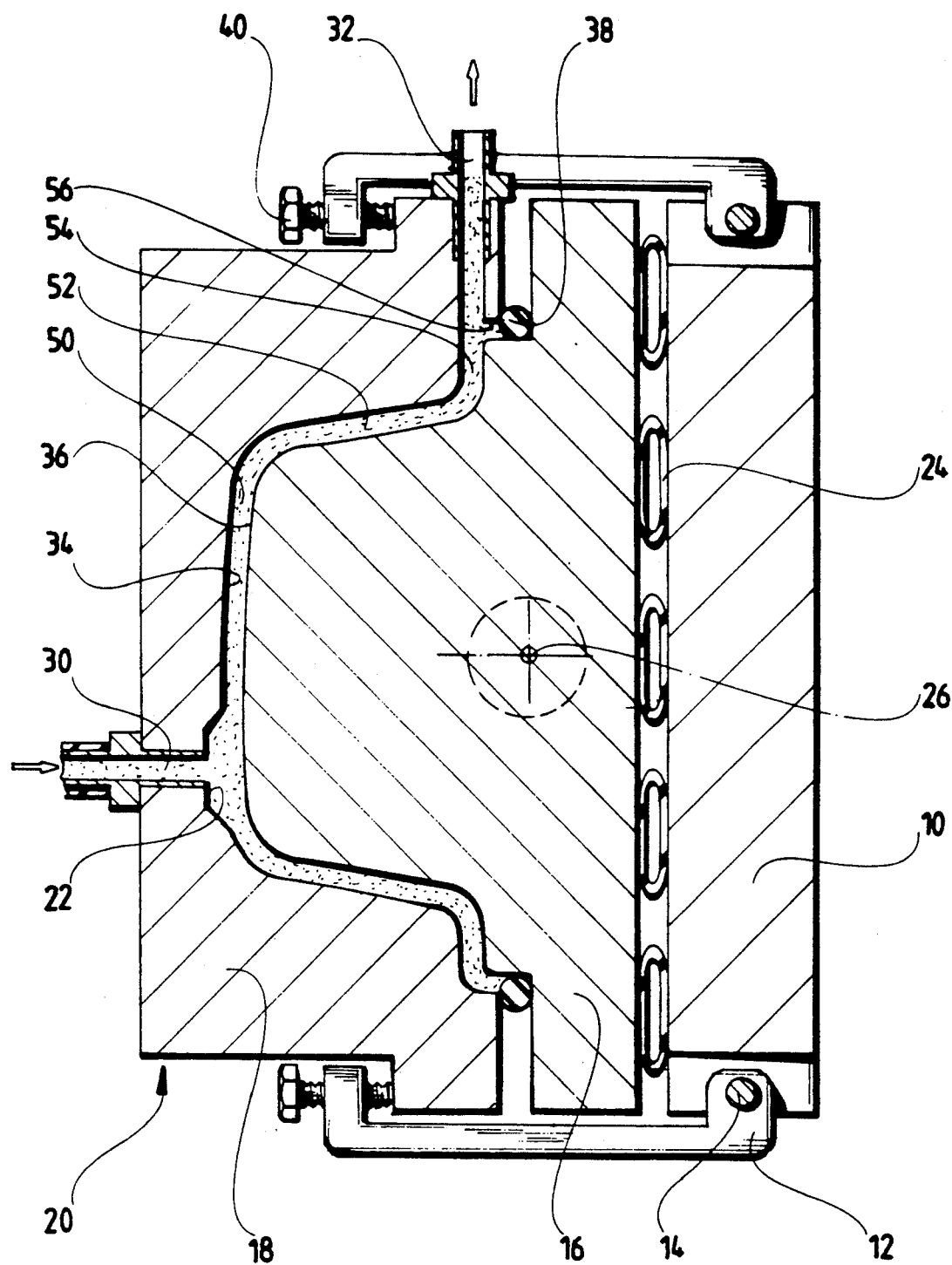
FIG. 1 a first mold in the filling position.

The mold half 18 has a runner 30 and a vent outlet 32, both of which lead into the mold cavity 22 and can be closed by means of valves, not illustrated herein. The mold cavity 22 is limited, on the one hand, by a mold surface 34 on the rear side formed by the mold half 18 as well as a mold surface 36 on the visible side formed by the mold half 16 and, on the other hand, by a circumferential, continuous gasket 38. The sealing-surface compression in the area of the gasket 38 can be adjusted by means of the setting screws 40 which are held in place in threaded bores of the clamps 12 and rest on a step of the mold half 18.

The kitchen sink to be manufactured by means of the mold 20 shown in FIG. 1 consists of a sink bottom 50, sink side walls 52, a circumferential flange 54 and a circumferential, elevated rim 56.

In order to fill the mold 20 via the runner 30 with the free-flowing mixture according to the invention consisting of a curable resin and a filler comprised, at least predominantly, of quartz particles, the vent outlet 32 is opened and the mold is placed in the position shown in FIG. 1. In accordance with the invention, the runner 30 opens into the rear mold surface 34 in the region of the sink bottom 50; the free-flowing mixture pumped into the mold cavity 22 first runs down along the side wall of the sink—which is located at the bottom in the filling position—until it reaches the region of the rim 56 located at the bottom so that the air there is not trapped in the mold cavity but can escape to the side and can leave the mold cavity 22 via the side regions of rim 56 extending upwards, not illustrated herein, and the upper region of rim 56 as well as via the vent outlet 32. In accordance with the invention, the amount of free-flowing mixture pumped into the mold cavity 22 is such that a small portion of the mixture emerges from the vent outlet 32. The runner 30 and the vent outlet 32 are then closed and the device is rotated about the pivot axis 26 into the curing position which is shown in FIG. 3 for the second mold.

The design of the mold and the arrangement of the filling position, as shown in FIG. 1, are also suitable for manufacturing kitchen sinks which, in a modification of the embodiment shown, have an angled rim 56 facing downwards, i.e., towards the bottom of the sink, because in such a case, too, the air can escape to the side and upwards from the region of the cavity 22 which defines the rim 56. This does not apply to the filling position shown in FIG. 2.

Figure 2:
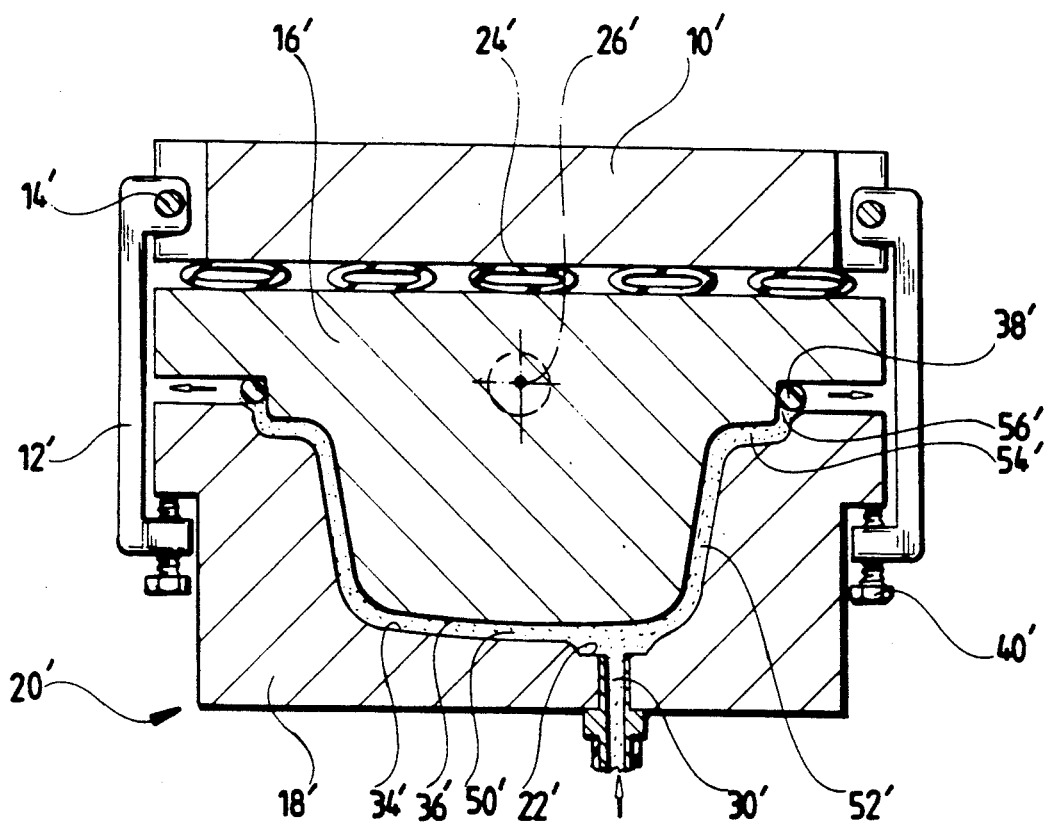
FIG. 2 a second mold in the filling position.
Figure 3:
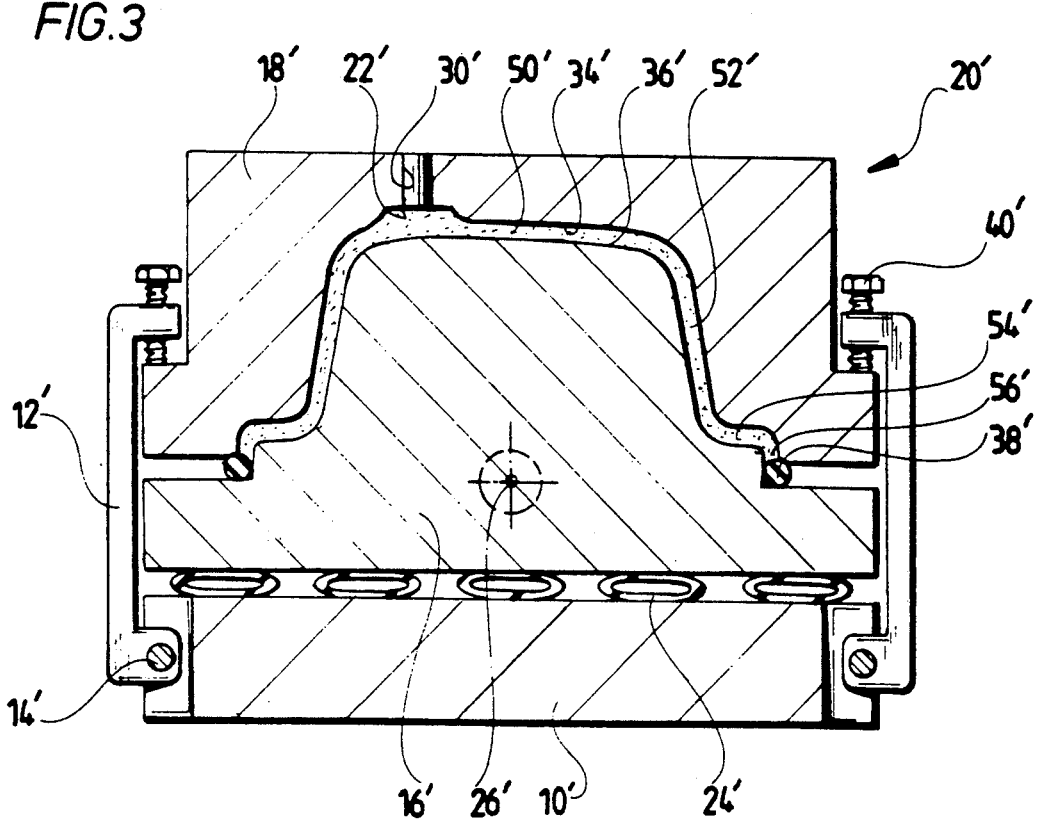
FIG. 3 the second mold in the curing position.

The same reference numerals as in FIG. 1 were used for the embodiment according to FIGS. 2 and 3, however with the addition of a prime sign ('). Although the mold 20' has a runner 30', it does not have a vent outlet especially for this purpose because, in the filling position shown in FIG. 2, the air in the mold cavity 22' can be evacuated past the gasket 38'. For this purpose, all that is required is to loosen the setting screws 40' during filling of the cavity to such a degree that the air can escape between the gasket 38' and the two mold halves 16' and 18'. It can also be advantageous to insert a strip of non-woven fabric between the gasket 38' and one or both mold halves 16' and 18', through which the air can escape but not the free-flowing mixture consisting of resin and filler that was pumped into the mold cavity.

As mentioned above, FIG. 3 shows the curing position in which the visible sides of the sink bottom 50 and of the flange 54 face downwards.

No heating or cooling devices for the molds 20 and 20' were shown since these are elements which are known from the manufacture of objects made of filled plastics.

A preferred composition of the free-flowing mixture to be processed is described hereinbelow:

74% to 76% by weight of crystalline quartz sand;
24% to 26% by weight of a solution of polymethyl methacrylate in methyl methacrylate, in which the proportion of the polymethyl methacrylate in this solution lies between 18% and 25% by weight;
1.2% by weight (with relation to the resin) of a peroxy catalyst;

0.2% to 0.4% by weight of a bonding agent which may already be present as coating on the filler particles;
2% by weight of a cross-linking agent.

Well-suited as mineral filler particles are all minerals which are sufficiently hard; if one can do without the feature of the unbroken grain shape, ground granite or crushed gravel are, for example, also suitable.

The present disclosure relates to the subject matter disclosed in German application No. P 38 32 351.6 of Sep. 23, 1988, the entire specification of which is incorporated herein by reference.

What is claimed is:

1. A component having a visible side and a rear side and consisting of a compound comprising a curable resin and a filler comprised, at least predominantly, of mineral filler particles, wherein
   (a) the visible side is formed by resin and filler particles substantially all of which are covered by said resin;
   (b) the mineral filler particles have an unbroken grain shape and a color coating on their surface;
   (c) the majority of the mineral filler particles have a size of between approximately 0.1 mm and approximately 2 mm;
   (d) the filler constitutes about 50% to 85% by weight of the compound; and
   (e) in the areas of the component subject to severe stress during use, the packing density of the mineral filler particles in said resin is greater on the visible side than on the rear side of the component.

2. Component according to claim 1, characterized in that the mineral filler particles consist of crystalline quartz sand.

3. Component according to claim 1, characterized in that the color coating contains at least-one color pigment and, as binder, an alkali silicate or a plastic selected from the group consisting essentially of polyurethane, methacrylate or epoxy resin.

4. Component according to claim 1, characterized in that the majority of the mineral filler particles have a size of between approximately 0.1 mm and approximately 1 mm.

5. Component according to claim 1, characterized in that approximately 70% to 85% of the mineral filler particles have a size of between approximately 0.1 mm and approximately 0.4 mm.

6. Component according to claim 1, characterized in that the filler constitutes approximately 70% to 80% by weight of the compound.

7. Component according to claim 1, characterized in that the filler constitutes at least approximately 73% by weight of the compound.

8. Component according to claim 1, characterized in that the matrix is colorless.

9. Component according to claim 1, characterized in that substantially all of the filler particles on the visible side are covered with a thin layer of the resin that forms the matrix.

10. Component according to claim 1, characterized in that the visible side exhibits a surface structure comprising small depressions between the mineral filler particles.

11. Component according to claim 1, characterized in that the resin matrix comprises polymethyl methacrylate.

12. Component according to claim 1, characterized in that the Taber abrasion value on the visible side in the areas of the component subject to severe stress during use lies below 4 mg/100 r.

13. Component according to claim 12, characterized in that the Taber abrasion value on the visible side in the areas of the component subject to severe stress during use is, at the most, approximately 3.5 mg/100 r.

14. Component according to claim 12, characterized in that the Taber abrasion value on the visible side in the areas of the component subject to severe stress during use lies between approximately 3.5 mg/100 r and approximately 3.0 mg/100 r.

* * * * *

UNITED STATES PATENT AND TRADEMARK OFFICE
CERTIFICATE OF CORRECTION

PATENT NO. : 5 218 013
DATED : June 8, 1993
INVENTOR(S) : Friedrich SCHOCK

It is certified that error appears in the above-identified patent and that said Letters Patent is hereby corrected as shown below:

Column 2, line 16; after "the like." insert ---At least almost all (i.e. substantially all) of the filler particles on the visible side are covered with a thin layer of the resin that forms the matrix.---

Column 7, line 35; replace "at least-one" with ---at least one---.

Signed and Sealed this

First Day of February, 1994

Attest:

BRUCE LEHMAN

Attesting Officer

Commissioner of Patents and Trademarks